UNITED STATES PATENT OFFICE.

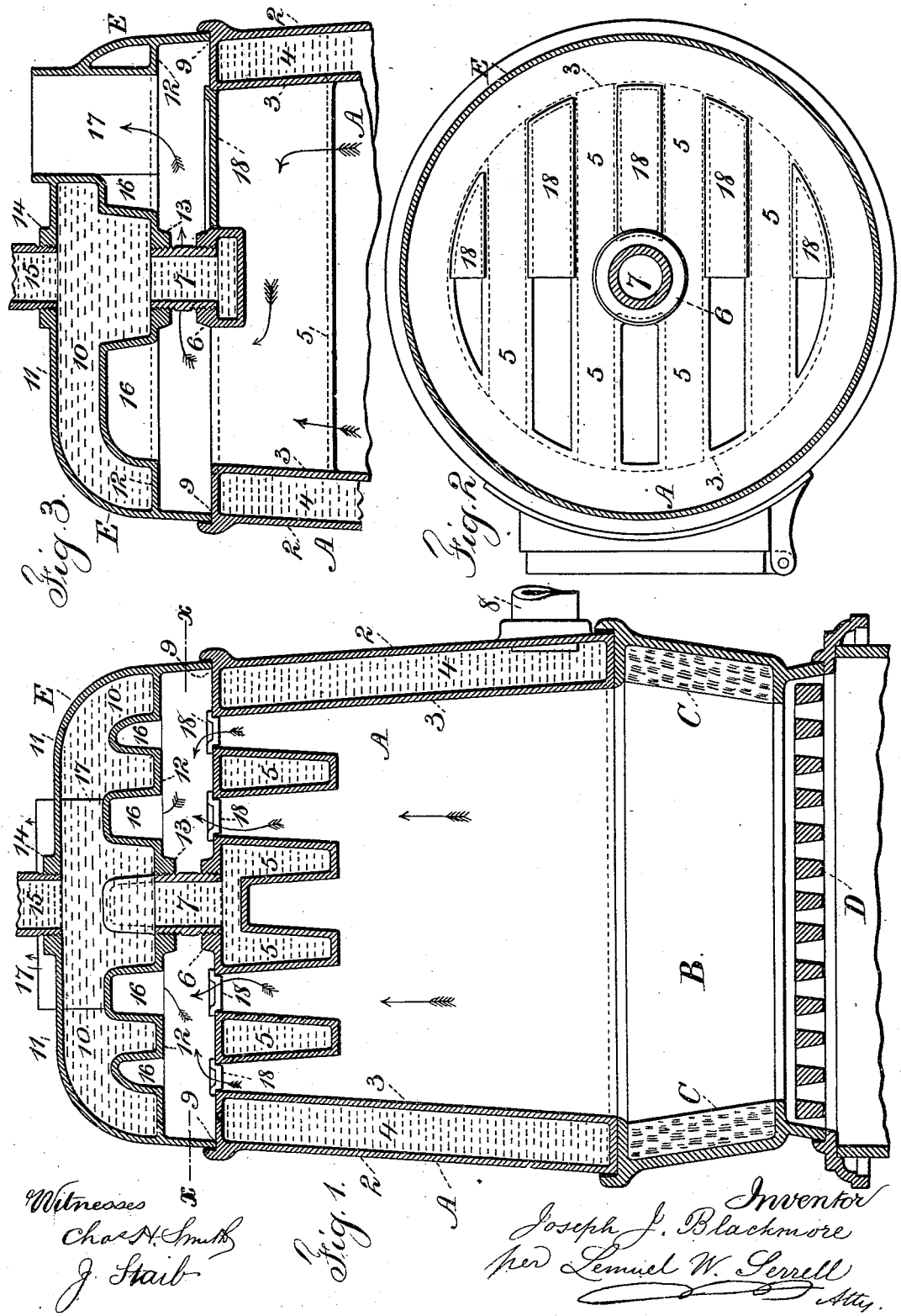

JOSEPH J. BLACKMORE, OF NEWARK, NEW JERSEY, ASSIGNOR TO THE
J. L. MOTT IRON WORKS, OF NEW YORK, N. Y.

WATER-HEATING APPARATUS.

SPECIFICATION forming part of Letters Patent No. 512,430, dated January 9, 1894.

Application filed March 27, 1893. Serial No. 467,694. (No model.)

*To all whom it may concern:*

Be it known that I, JOSEPH J. BLACKMORE, a subject of the Queen of Great Britain, residing at Newark, in the county of Essex and State of New Jersey, have invented an Improvement in Water-Heating Apparatus, of which the following is a specification.

This invention is adapted to heat water that circulates through pipes in green-houses, dwellings, &c., there being but little pressure upon the water or in the heating apparatus, but this boiler may be used for heating water for domestic purposes, the water being supplied into the said boiler as it may be drawn off for use.

The heater is of cast iron made with internal and external walls and a water space between the two, and there are transverse water ways in the upper part of the boiler with openings between them through which the products of combustion pass, and the water is supplied to the bottom of the cylindrical shell and passes off from a central connection through the cross water ways, and I add above the top of the boiler a hollow vessel, the under heating surface of which is increased by hollow projecting ribs, and the opening for the products of combustion passes up through this hollow cap or cover, and the water passes from one part of the heater to the other through a screw thimble forming a central connection.

In the drawings, Figure 1 is a vertical section of the apparatus. Fig. 2 is a plan below the line $x\,x$, and Fig. 3 is a section at right angles to Fig. 1, of the upper part of the heating apparatus.

The main water heating vessel A is above the fire pot B and it is preferable to line the fire pot B with brick C, and the grate D is of any desired construction.

The main water holding vessel A is made with an outer wall 2 and an inner wall 3 united together at the top and bottom so as to form an annular water chamber 4, and in the upper portion of the main vessel A are transverse water tubes 5 opening at their ends into the chamber 4, and these transverse water tubes are preferably slightly wider at their upper edges than at their lower edges, so as to form between them passage ways for the products of combustion, and there is a socket 6 central to the vessel A and opening into two of the transverse water tubes. I have shown and prefer the socket 6 to open into a cross passage way between two of the transverse water tubes 5, and there is connected with this socket the pipe or thimble 7; and it is to be understood that the water that is to be heated passes into the annular water chamber 4 by a pipe 8 near the bottom edge thereof, and such water circulates around through the annular water chamber and the transverse water tubes, and passes out through the pipe or thimble 7 as such water becomes heated and circulates.

I employ in addition to the main vessel A the auxiliary heating cap E, the lower edges 9 of which rest upon the top of the main vessel A, and such cap is hollow having a water chamber 10 between the top plate 11 and the bottom plate 12, and in the center of this bottom plate 12 is a socket 13, into which the upper end of the thimble 7 is screwed, and there is a socket 14 in the top plate 11 for the reception of the pipe 15 of the circulating system, and I make the under side of the auxiliary heating cap with channels or corrugations 16 to increase the heating surface of the bottom plate 12, and these channels or corrugations are preferably over the spaces between the transverse water pipes 5, and through this auxiliary heating cap the flue pipe 17 passes, so that the products of combustion as they rise from the fire within the fire pot B, circulate around within the main vessel A, pass up between the pipes 5 into the corrugations or channels 16, heating the metal composing the respective vessels and imparting the heat to the water that circulates within the chambers and pipes, and the products of combustion escape by the flue pipe 17.

I find it advantageous to employ deflecting plates 18 covering or inclosing the space between the transverse water pipes 5 below and adjacent to the flue pipe 17, so that the products of combustion will not escape too rapidly and directly to this flue pipe 17, such products of combustion being directed by the deflecting plates away from the flue, so as to act more efficiently in heating up the whole apparatus with uniformity or nearly so.

The upper plate of the auxiliary heating cap may either be plain or corrugated, and the corrugations or channels in the under plate of said auxiliary heating cap may either be transverse, radial or curved, and they open into the flue pipe.

By the aforesaid construction a very simple and efficient heating device is provided and the same occupies but little space.

I claim as my invention—

1. The circular water heating vessel A having inner and outer walls and an intermediate water chamber, the transverse parallel water tubes in the upper part opening at their ends into the water chamber, and the central socket opening into two of the transverse water tubes and a pipe screwed into the opening, there being a pipe through which water passes into the lower part of said vessel, in combination with the auxiliary hollow heating cap above the main vessel A and having a socket for the reception of the pipe connecting the same to the main vessel, and a socket for the pipe through which the water circulates, a flue pipe passing through the auxiliary water vessel, there being corrugations in the bottom opening into the flue pipe, substantially as set forth.

2. The water heating vessel A having inner and outer walls and an intermediate water chamber, the transverse parallel water tubes in the upper part opening at their ends into the water chamber, and the central socket opening into two of the transverse water tubes, and a pipe screwed into the opening, there being a pipe through which water passes into the lower part of said vessel, in combination with the auxiliary hollow heating cap above the main vessel A and having a flue pipe passing through the cap and a socket for the reception of the pipe connecting the cap to the main vessel, and a socket for the pipe through which the water circulates, the bottom plate of the auxiliary water vessel having corrugations that open at one end into the flue pipe, and deflecting plates covering portions of the openings between the transverse water tubes and below the flue pipe, substantially as set forth.

Signed by me this 20th day of March, 1893.

JOSEPH J. BLACKMORE.

Witnesses:
MAX GOEBEL,
HENRY MORFORD.